United States Patent
Galbiati

(10) Patent No.: US 11,888,431 B2
(45) Date of Patent: Jan. 30, 2024

(54) METHODS AND SYSTEMS OF SENSING BACK-ELECTROMOTIVE FORCE IN ELECTRIC MOTORS

(71) Applicant: STMicroelectronics S.r.l., Agrate Brianza (IT)

(72) Inventor: Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 3 days.

(21) Appl. No.: 17/815,790

(22) Filed: Jul. 28, 2022

(65) Prior Publication Data
US 2023/0061437 A1 Mar. 2, 2023

(30) Foreign Application Priority Data
Aug. 24, 2021 (IT) .................. 102021000022217

(51) Int. Cl.
*H02P 27/08* (2006.01)
*H02P 6/182* (2016.01)
*H02P 6/08* (2016.01)

(52) U.S. Cl.
CPC ............... *H02P 6/182* (2013.01); *H02P 6/08* (2013.01)

(58) Field of Classification Search
CPC ............. H02P 27/08; H02P 6/08; H02P 6/182
USPC .................................................. 318/400.35
See application file for complete search history.

(56) References Cited

U.S. PATENT DOCUMENTS

| | | | | |
|---|---|---|---|---|
| 6,420,847 B1 * | 7/2002 | Galbiati | .................. | H02P 6/182 318/632 |
| 8,054,023 B2 * | 11/2011 | Cassiano | ................... | H02P 6/20 318/459 |
| 2006/0066280 A1 * | 3/2006 | Bhaumik | ................ | H02P 6/185 318/599 |
| 2006/0214611 A1 | 9/2006 | Wang et al. | | |
| 2009/0033263 A1 * | 2/2009 | Cassiano | ................. | H02P 6/182 318/400.35 |
| 2011/0254488 A1 * | 10/2011 | Clothier | .................... | H02P 6/15 318/400.14 |
| 2014/0062358 A1 * | 3/2014 | Reynolds | ................ | H02P 25/03 318/400.06 |
| 2014/0354201 A1 * | 12/2014 | Maiocchi | ................ | H02P 6/085 318/400.27 |

(Continued)

FOREIGN PATENT DOCUMENTS

CN 108233792 B 9/2020

*Primary Examiner* — Kawing Chan
*Assistant Examiner* — Gabriel Agared
(74) *Attorney, Agent, or Firm* — Slater Matsil, LLP

(57) ABSTRACT

A method includes driving a selected motor winding to be in a tri-state during a time interval having a finite time length value of a time window, sensing a zero-crossing (ZC) of an oscillating back electromotive force induced in the motor winding during the time window in which the motor winding is in the tri-state, and producing a ZC sensing signal, which has a first edge at a first time instant at the sensed ZC and a second edge at a second time instant separated from the first time instant by a half oscillation of the oscillating back electromotive force, detecting a phase of a current flowing in the motor winding at a time instant time-shifted with respect to the second time instant of the second edge of the ZC sensing signal, and adjusting the finite time length value based on the detected phase of the current.

20 Claims, 11 Drawing Sheets

(56) References Cited

U.S. PATENT DOCUMENTS

2015/0002065 A1* 1/2015 Boscolo .................. H02P 6/182
318/400.35
2015/0145455 A1 5/2015 Heynlein et al.

* cited by examiner

METHODS AND SYSTEMS OF SENSING BACK-ELECTROMOTIVE FORCE IN ELECTRIC MOTORS

CROSS-REFERENCE TO RELATED APPLICATIONS

This application claims the priority benefit of Italian Patent Application No. 102021000022217, filed on Aug. 24, 2021, entitled, "Methods and systems of sensing back-electromotive force in electric motors," which is hereby incorporated herein by reference to the maximum extent allowable by law.

TECHNICAL FIELD

The description relates to electric motors. In particular, the description relates to sensing a back electromotive force (BEMF) signal induced in a phase winding of a brushless motor driven in pulse with modulation (PWM) mode, for instance.

One or more embodiments relate to a method of adjusting a size of a time window during which BEMF sensing is performed.

One or more embodiments may be applied to hard-disk drive (HDD) applications, to drive a spindle motor thereof, for instance.

BACKGROUND

Brushless motors can be used in hard disk drives (HDD), for instance.

These motors comprise a permanent magnet rotor and a stator including a plurality of phase windings.

The phase windings are energized according to a cyclic sequence that is synchronized with the instantaneous position of the rotor.

Synchronization can be established sensing the back electromotive force (BEMF) on a phase winding that is temporarily in a high impedance state. As the BEMF voltage is sinusoidal (or at least oscillating), respective zero-crossing events can be used as fiducial marks.

In an alternating current, a zero-crossing (ZC) is an instantaneous point in time at which there is zero signal. In a sine wave or other relatively simple waveform, ZC events may occur twice per cycle.

The size of the time window for observing the ZC events corresponds to a time interval whose duration is expressed in electrical degrees.

During this time window, one of the three half bridges driving the spindle motor is tri-stated in order to read the ZC transition of the BEMF signal. The ZC detection signal obtained is suitable to be used as a reference to maintain a synchronization between the motor driving signals and the actual rotor position.

Such a window size can be determined as a function of the motor acceleration and phase current amplitude.

A three-state or tri-state logic causes an output or input node to assume a high impedance state, practically removing the output from the circuit, in addition to the usual "o" and "1".

A conventional method of determining the observation window size in a brushless motor is known, for instance, from U.S. Pat. No. 8,054,023B2.

This document discusses a method of driving a sensorless and/or brushless motor in PWM mode, the method including tri-stating a winding during a time window for detecting a zero-crossing (ZC) event of the back electromotive force induced in the winding by rotation of a rotor, monitoring voltage of the tri-stated winding during an unmasked portion of the time window, and detecting during the time window a ZC event of the induced back electromotive force. The method includes verifying whether the ZC event occurred during the unmasked portion, modifying for the next cycle the duration of the time window and/or of the unmasked portion thereof based upon the verification, defining a safety interval in the unmasked time window, modifying the duration of the time window and/or of the unmasked portion thereof depending on whether the ZC event has been detected during the safety interval. Once the system is at steady condition, with the motor speed set at the target value, the window size is reduced to the minimum size that provides a ZC detection. Window size increment/decrement is performed based on an early ZC sensing signal. In particular, during motor acceleration this early ZC sensing signal indicates, to an automatic routine configured to adjust the window size, that the ZC has been detected in a time instant falling outside of the observation region.

Existing solutions suffer from various drawbacks such as, for instance, in a steady state, the window size is minimized, in case of a spindle current increase (e.g., due to an external shock event), the current recirculation time becomes longer that the observation window. Also, the system reacts by enlarging the window size only after an early ZC detection, so that the system is already in error while detecting the real rotor position. Further, there is a risk of system loop instability due to errors, and there is a limited possibility of predicting a possible fault in ZC detection.

SUMMARY

An object of one or more embodiments is to contribute in advancing one or more aspects with respect to existing solutions.

According to one or more embodiments, that object can be achieved by means of a method having the features set forth in the claims that follow.

One or more embodiments may relate to a corresponding control system, for instance an HDD system configured to drive a spindle motor.

One or more embodiments may relate to a corresponding brushless electric motor.

The claims are an integral part of the technical teaching provided herein with reference to the embodiments.

One or more embodiments facilitate detecting zero-crossing (ZC) of a spindle motor, automatically adjusting of the window size based on an acceleration profile of the polarity of a spindle current.

One or more embodiments present one or more of the following advantages: increased adaptability in response to external perturbations, such as shocks, for instance, exploiting early corrective adjustments that prevent possible issues linked to an incorrect ZC detection, increased robustness versus loop instability, with ZC detection exploited in combination with speed control loop, appreciable reduction of the risk of de-synchronization with respect to the rotor position, drifts towards un-safe operating conditions for driving a spindle motor can be detected and a related warning can be sent to a user circuit, or possibility to reduce the ample design margin otherwise involved in selecting the window size manually.

BRIEF DESCRIPTION OF THE DRAWINGS

One or more embodiments will now be described, by way of non-limiting example only, with reference to the annexed Figures, wherein:

FIG. 6A comprises an enlarged view of a portion of time diagrams of signals in

FIG. 6;

FIG. 6B comprises an enlarged view of a portion of time diagrams of signals in

FIG. 6;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The drawings are in simplified form and are not to precise scale.

Throughout the figures annexed herein, like parts or elements are indicated with like references/numerals and a corresponding description will not be repeated for brevity, unless the context indicates otherwise.

The references used herein are provided merely for convenience and hence do not define the extent of protection or the scope of the embodiments.

For the sake of simplicity, in the detailed description that follows a same reference symbol may be used to designate both a node/line in a circuit and a signal which may occur at that node or line.

Figure 1:
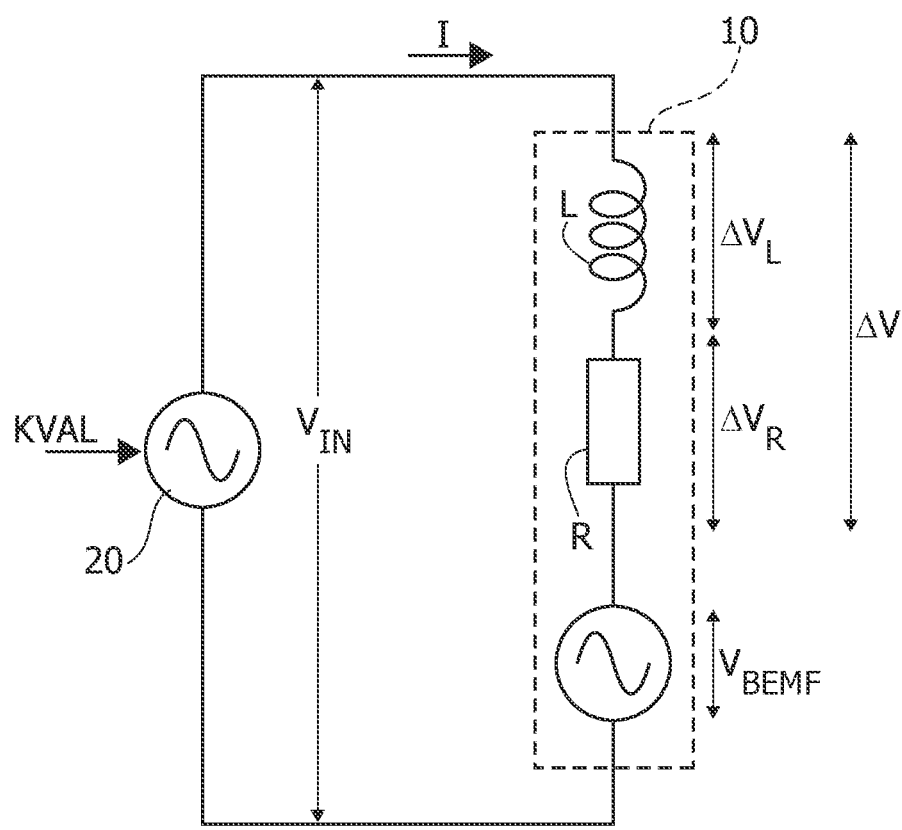
FIG. 1 is a diagram exemplary of a model of an electric motor.

As exemplified in FIG. 1, an electric motor coil 10 is modeled as an inductance L in series with a resistance R and with a voltage generator $V_{BEMF}$ representing the back-electromotive force (BEMF) contribution.

For instance, the electric motor 10 is driven by a driver signal source 20 generating a driving voltage $V_{IN}$ as a function of one or more driving parameters KVAL, where an electric current I flows into the electric motor coil as a result of the driving signal.

As exemplified in FIG. 1, a voltage difference $\Delta V$ across the RL series circuit portion is indicative of a difference between the driving signal $V_{IN}$ and the BEMF voltage $V_{BEMF}$, e.g., $\Delta V = \Delta V_L + \Delta V_R = V_{IN} - V_{BEMF}$.

In a manner per se known to those of skill in the art, the relationships between BEMF voltage $V_{BEMF}$, driver voltage $V_{IN}$ and voltage difference $\Delta V$ can be represented using vectors in a (e.g., complex) plane.

Figure 2:
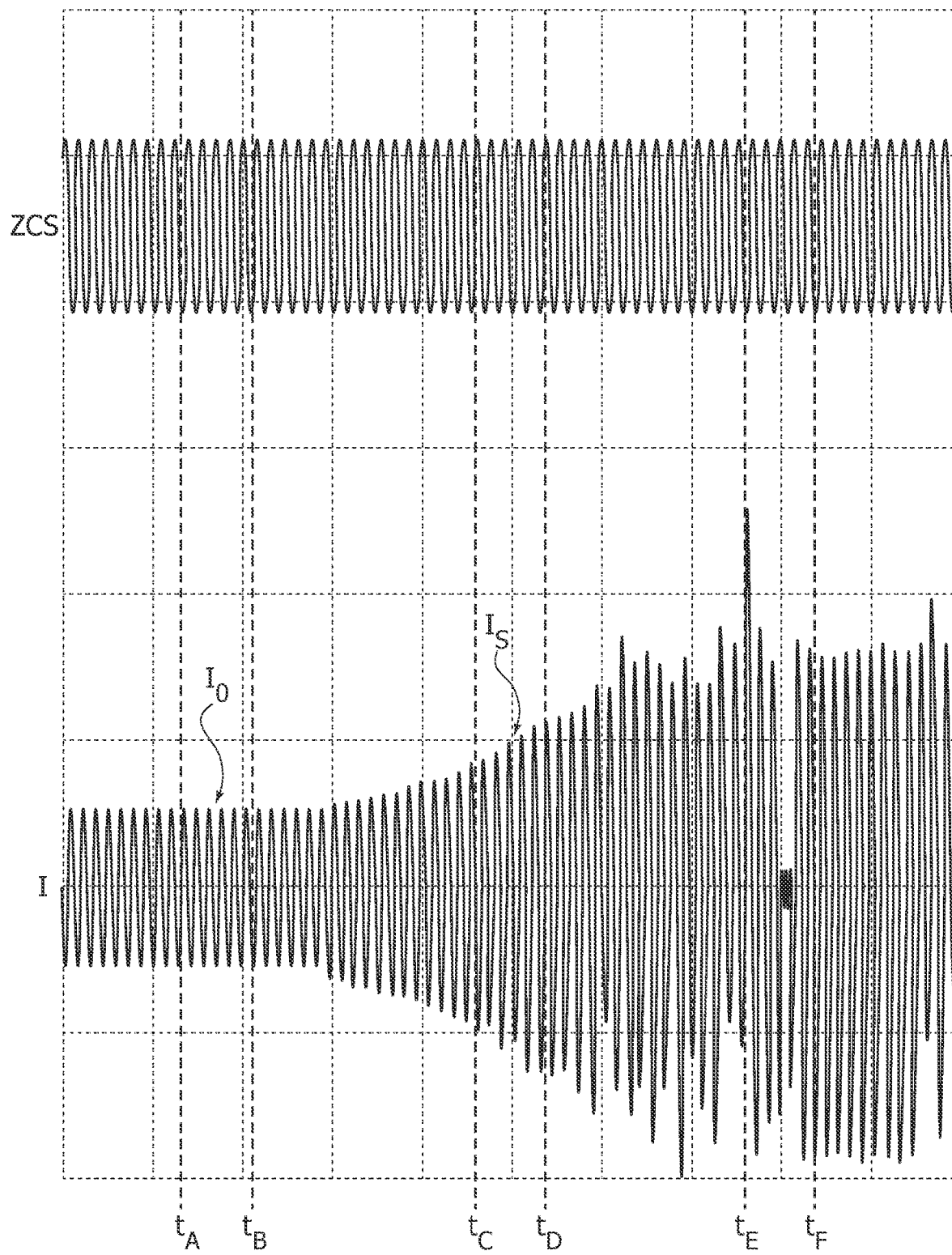
FIG. 2 comprises time diagrams of signals in an electric motor.

As exemplified in FIG. 2, the driving signal VIN is an oscillating signal, e.g., sinusoidal, so that the current I flowing into the motor 10 has a same oscillating waveform. For instance, detecting a zero-crossing (ZC) event of the current signal I comprises opening an observation window at nodes or zeros of the oscillating current signal, producing a respective detection signal ZCS in response to detected ZC events. For instance, the detection signal ZCS is a digital signal having (e.g., rising or falling) edges at the detected ZC events.

As a result of the relation existing between input voltage $V_{IN}$ and the BEMF voltage signal $V_{BEMF}$, the latter is also sinusoidal, so that a pair of ZC events separated by a phase of 180 electrical degrees (or n radians) are expected to take place in a time interval of an (time period of) oscillation of the BEMF voltage signal $V_{BEMF}$. Consequently, sensing of one of the ZC events is performed once, in correspondence of one of the two ZC events.

Figure 3A:
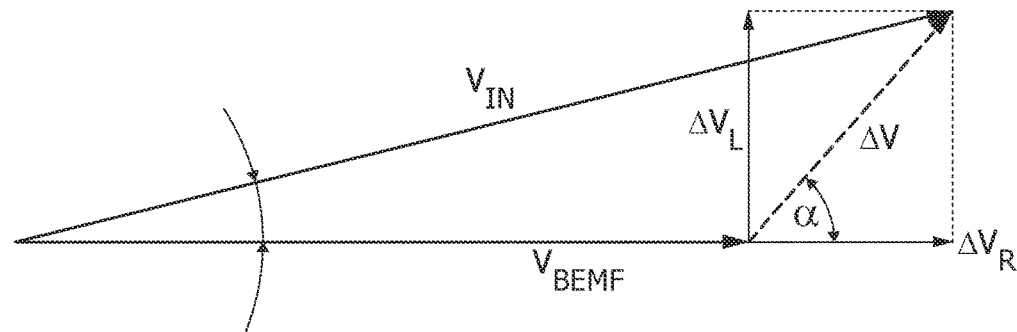
FIG. 3A is exemplary of relations between quantities in the model of FIG. 1.
Figure 3B:
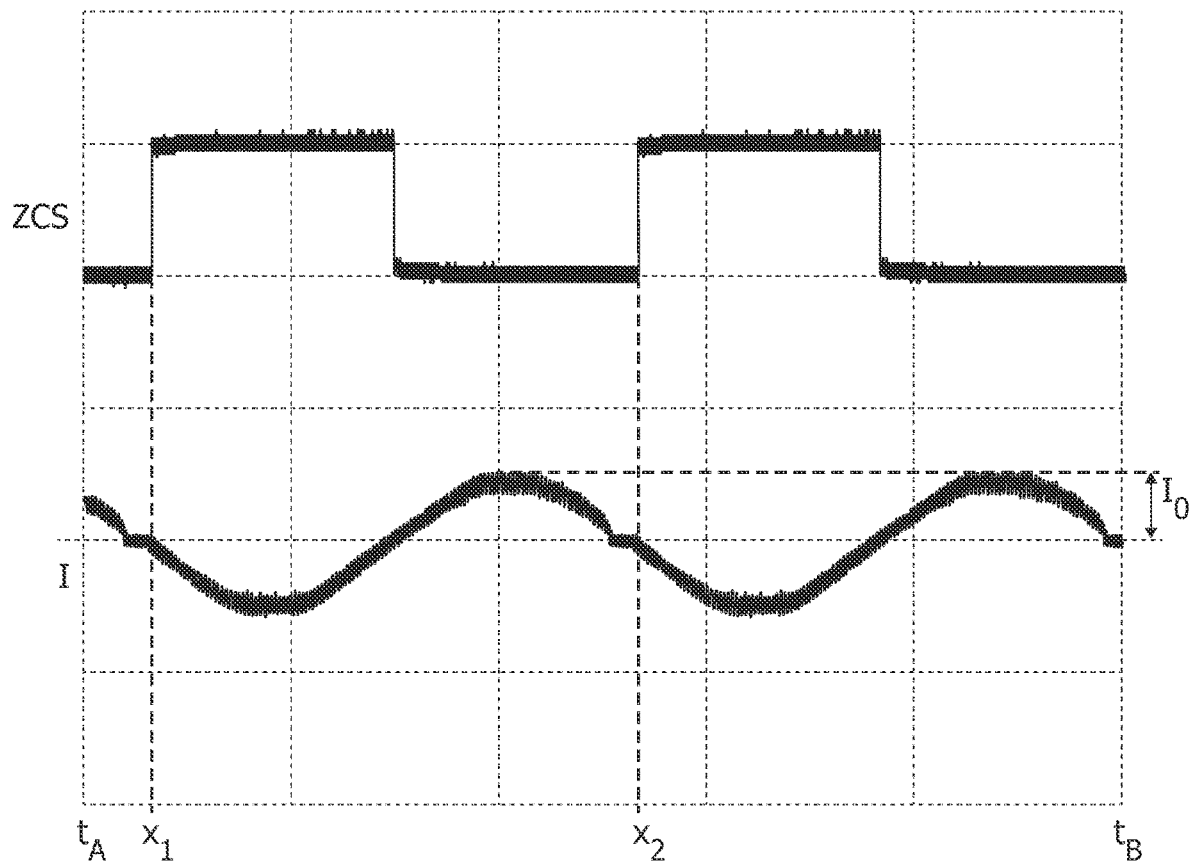
FIG. 3B comprises an enlarged view of a portion of time diagrams of signals in FIG. 2.

For instance, with reference to the example represented in FIG. 3B, sensing the ZC event comprises opening the observation window once per oscillation (or period) of the BEMF voltage signal $V_{BEMF}$, e.g., at the (e.g., falling) edge of the voltage signal $V_{BEMF}$, generating a corresponding (e.g., falling) edge of the ZC detection signal in response.

For instance, conventional systems are configured to generate an (e.g., rising) edge of the ZCS signal in response to detecting the ZC event in the BEMF voltage signal $V_{BEMF}$, and to (digitally) generate a further (e.g., falling) edge (e.g., in anti-phase with the first edge) of the ZCS signal, e.g., at half oscillation period (or 180 electrical degrees or n radians) past the detected ZC event in the BEMF voltage signal $V_{BEMF}$.

FIG. 3A is a vector representation of the driving signal VIN and of the BEMF voltage $V_{BEMF}$ during a steady-state time interval tA to tB exemplified in FIG. 2.

FIG. 3A is a vector representation of the driving signal $V_{IN}$ and of the BEMF voltage $V_{BEMF}$ during a steady-state time interval $t_A$ to $t_B$ exemplified in FIG. 2.

As exemplified in FIGS. 3A and 3B, as long as the motor 10 is in a steady, unperturbed, state, existing methods of detecting ZC events may provide a detection signal ZCS properly synched with ZC events in the BEMF voltage signal (e.g., represented to occur at time instants $x_1$ and $x_2$ in FIG. 3B). This can be appreciated by noting that (e.g., rising) edges of the portion of detection signal ZCS represented in FIG. 3B are aligned with ZC events at $x_1$, $x_2$ (the alignment with the sinusoidal current signal I being indicated using dashed lines intersecting edges of detection signal ZCS and time instants x1, x2).

In case an external perturbation affects the motor 10, it may cause an abrupt speed variation, for instance a slow-down. In particular, an impulsive-kind of shock may affect the motor 10 during a narrow ZC observation window, such as an external shock hitting the hard disk drive equipped with the electric motor 10.

In response to such a perturbation, the speed control may compensate the induced slow-down by increasing the current I driven in the motor 10. For instance, the parameter KVAL may vary, resulting in an increased driving voltage $V_{IN}'>V_{IN}$ being applied to the electric motor 10. This further results in an increase of the maximum amplitude of the current I provided to the electric motor coil, e.g., from the steady state value $I_0$ exemplified in FIG. 3B to an increased value $I_S$ exemplified in FIG. 3D. As a result, some delay δ may be introduced in the phase of the current signal I, possibly affecting detection of the actual ZC position in time of the BEMF voltage signal $V_{BEMF}$.

Figure 3C:
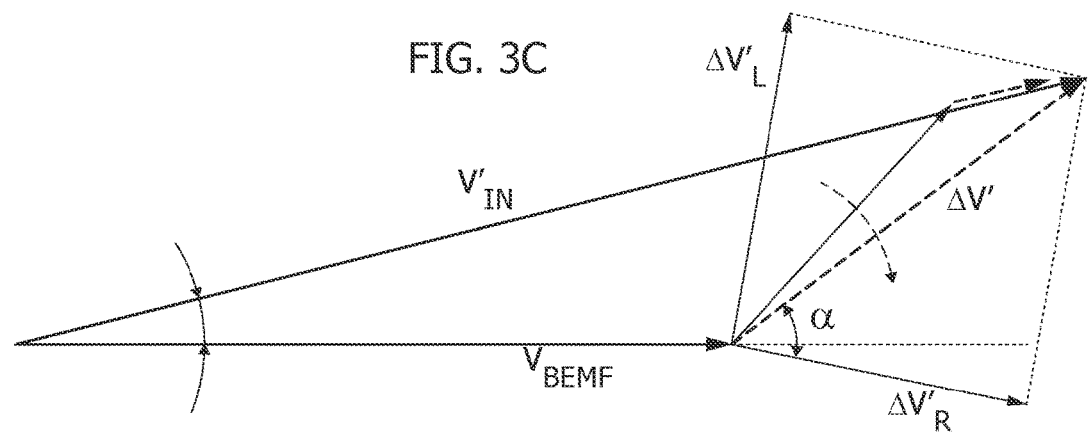
FIG. 3C is exemplary of relations between quantities in the model of FIG. 1.

FIG. 3C is a vector representation of perturbed input voltage $V_{IN}'$ and BEMF voltage $V_{BEMF}$ during a perturbed time interval t c to t D exemplified in FIG. 2.

Figure 3D:
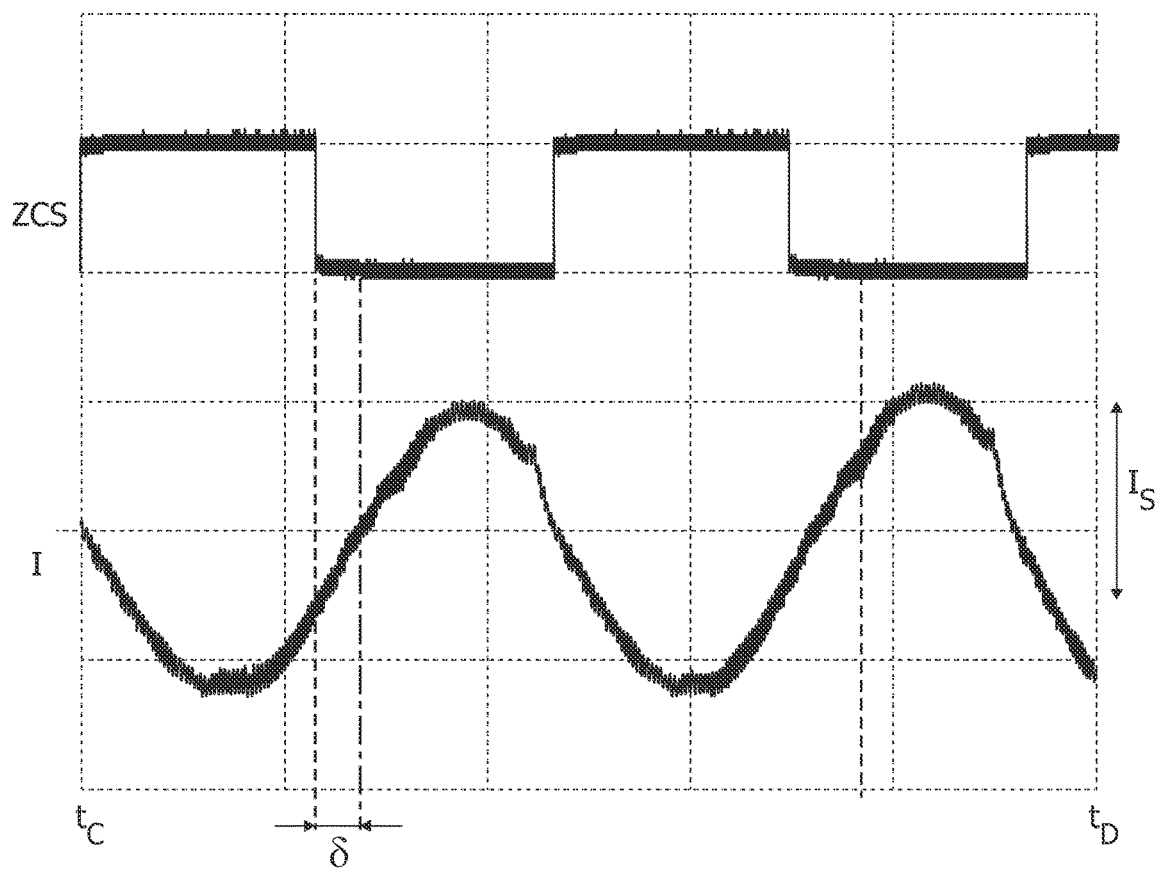
FIG. 3D comprises an enlarged view of a further portion of time diagrams of signals in FIG. 2.

FIG. 3D is an enlarged view of current I and detection signal ZCS during the same perturbed time interval $t_C$ to $t_D$ exemplified in FIG. 2.

As exemplified in FIGS. 3C and 3D, existing solutions may hardly be capable of maintaining synchronism with the amplified current signal I, so that the ZC signal may lag behind, e.g., by the time/phase delay δ. In other words, the actual ZC of the current signal I (at the vertical chain line in FIG. 3D) may have a phase delay δ with respect to (e.g., falling) edges of the detection signal ZCS (at the vertical dashed line in FIG. 3D).

For instance, the delay δ results in an error in detecting the position of the rotor of the motor 10, leading to possible risks of synchronism loss between the driving signal $V_{IN}$ and the actual position of the rotor. Such a position detection error may trigger system instability, as exemplified in the time interval $t_E$ to $t_F$ in FIG. 2. This may lead to performance degradation and eventually to loss of control of the electric motor 10.

As exemplified in FIG. 3D, both the variation of the amplitude of the current signal I from the steady state value $I_0$ to the increased value $I_s$ and the introduction of the phase delay δ can produce a "false", spurious value of the ZC sensing signal ZCS. For instance, this can be due to the discharge of the current signal I taking a longer time that the time length in which the observation window is opened for the detection of the zero-crossing transition. As a result, during the tri-state phase BEMF measurement is hardly possible, leading to a lack of information regarding the correct rotor position.

Conventional observation window adjustment methods can hardly follow instantaneous, impulsive variations of the behavior of the current and even the most reactive present a delay between detection and correction of the effect.

One or more embodiments are directed at improving existing methods in order to counter detection of "false", spurious ZC events and improve stability of observation window adjustment methods.

One or more embodiments comprise checking polarity of the current signal I after the (e.g., falling) edge of the ZC sensing signal ZCS generated at half an oscillation period past the detected ZC event.

For instance, checking the polarity at a time instant shifted, e.g., by a half oscillation period (or about 180 electrical degrees or n radians) plus a time shift G with respect to the opening time of the ZC observation window facilitates monitoring whether the current signal I is lagging with a growing delay δ, as discussed in the following.

One or more embodiments may facilitate preventing possible errors in sensing ZC events in the BEMF voltage signal $V_{BEMF}$ at their actual time instant, as discussed in the following.

As exemplified herein, a method comprises detecting a phase of the current signal I with respect to the BEMF voltage $V_{BEMF}$ at a time instant shifted with respect to the time instant at which the ZC events is detected in the BEMF voltage signal $V_{BEMF}$, the time instant being shifted by a certain time shift (e.g., 180 electrical degrees or n radians), as discussed in the following.

Figure 4:
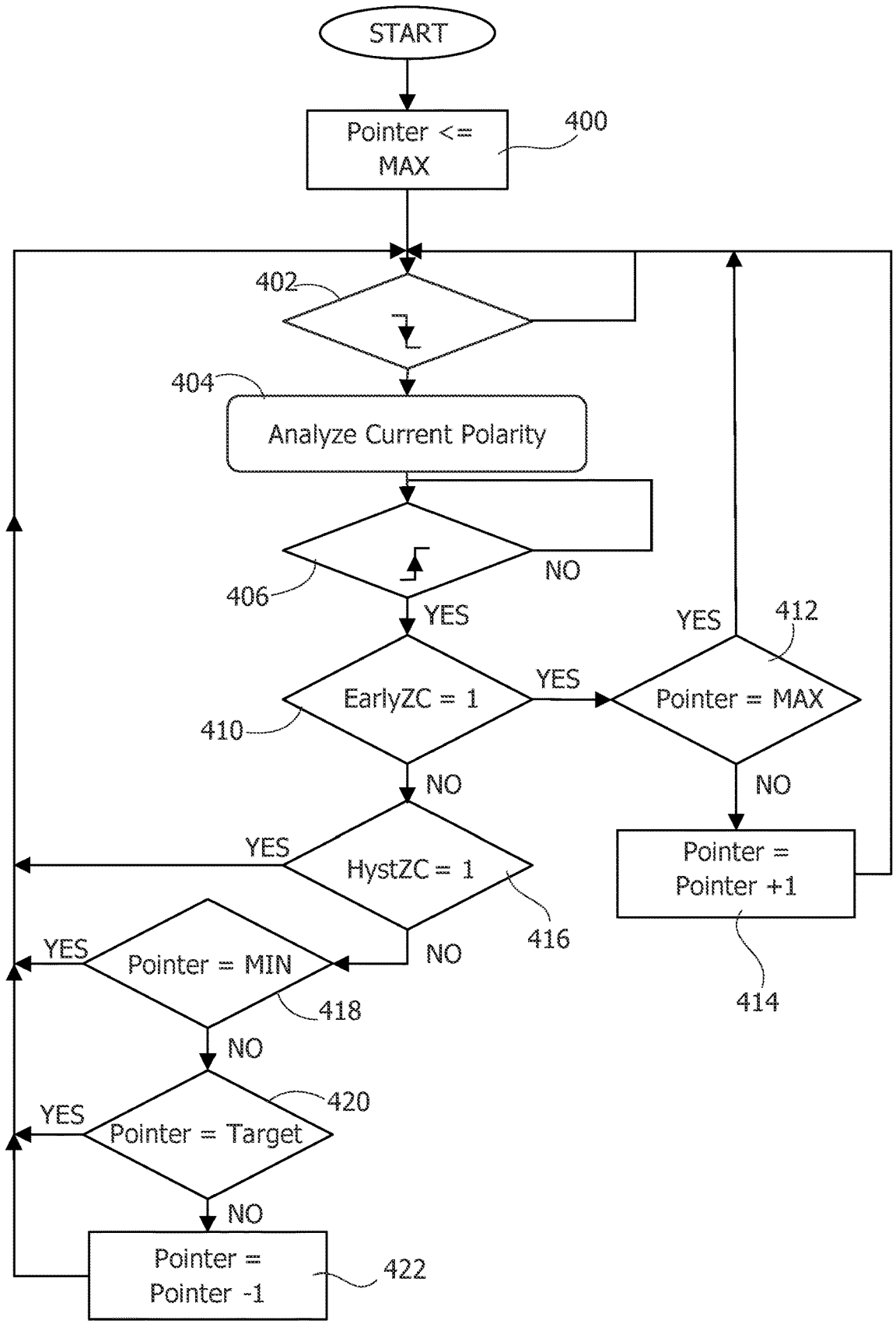
FIG. 4 is a flowchart exemplary of operations of a method as per the present disclosure.
Figure 5:
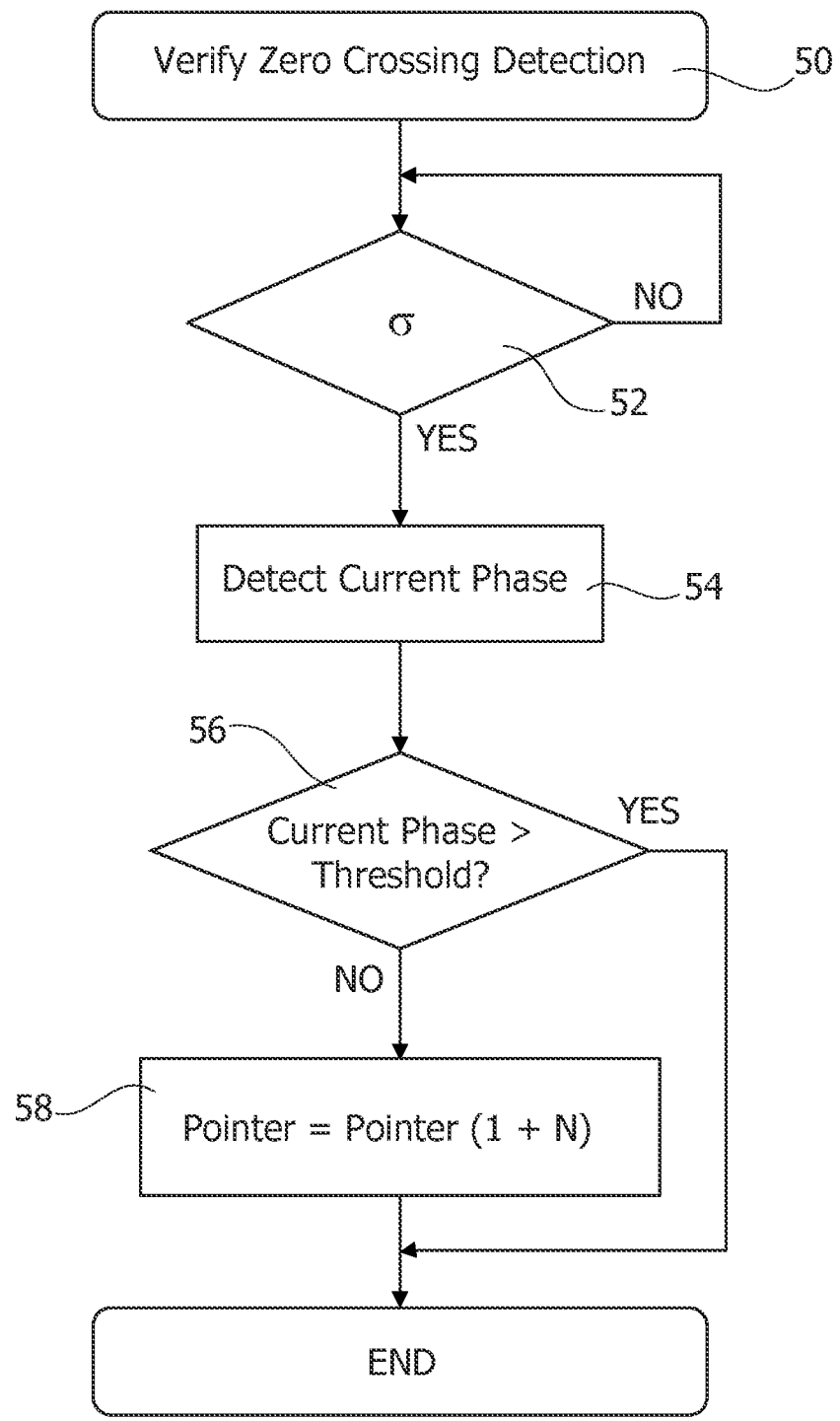
FIG. 5 is a flowchart exemplary of operations of a portion of the flowchart of FIG. 4.

As exemplified in FIG. 4, a method of sensing a zero-crossing of a tri-stated electric motor component comprises:

block 400: providing a pointer POINTER and initializing the pointer to an initial value equal to a value of the time-window during which sensing of the zero-crossing is performed, the initial value preferably selected from a look-up table storing possible durations of the time window for ZC sensing and of a masked portion thereof, block 402: performing sensing of the zero-crossing of the BEMF voltage signal $V_{BEMF}$ (e.g., at half oscillation past the one detected during the time-length of the observation window) and verifying whether a ZC event has been detected in the BEMF voltage signal VBEMF, for instance by checking the presence of an (e.g., falling) edge in the ZC sensing signal ZCS, block 404: analyzing polarity of the current I, e.g., by detecting a phase of the current signal I with respect to the BEMF voltage $V_{BEMF}$ at a time instant G shifted with respect to the time instant at which the zero-crossing is detected, the shifted time instant being shifted by a certain time shift (e.g., 20° electrical degrees and/or a custom delay interval), as discussed in the following with reference to FIG. 5, block 406: verifying whether a zero-crossing event has been detected, for instance by checking if the ZC sensing signal ZCS has a rising edge, block 410: in case of a positive check in block 406 indicating that zero-crossing has been detected, the method comprises checking whether the sensed ZC event occurred during a masked portion of the time window by checking a dedicated mask flag EARLYZC having a first value (e.g., EARLYZC=1) in case the time instant at which the ZC is detected belongs to the masked portion and a second value (e.g., EARLYZC=0) in case the time instant at which the ZC is detected does not belong to the masked portion, blocks 412: in case the dedicated mask flag EARLYZC has the first value (e.g., EARLYZC=1), verifying whether the pointer POINTER can be increased or if it has already reached a maximum attainable value MAX (e.g., the maximum value stored in the lookup table of possible time interval values), block 414: in case the pointer POINTER has not reached the maximum attainable value MAX yet, incrementing the pointer POINTER, e.g., by one unit, increasing a duration of the time window for ZC sensing as a result, blocks 416: in the opposite case in which the dedicated mask flag EARLYZC has the second value (e.g., EARLYZC=0), the method comprises checking whether a further mask flag HYSTZC has a first value (e.g., HYSTZC=1) or a second value (e.g., HYSTZC=0), in a manner per se known, e.g., from document U.S. Pat. No. 8,054,023B2, block 418: in case the hysteretic signal HYSTZC has the second value (e.g., HYSTZC=0), the method comprises verifying whether the pointer POINTER has a value equal to a minimum value MIN, e.g., by comparing the pointer value POINTER with the minimum value MIN stored in the lookup table of possible observation window duration values, block 420: in case the pointer POINTER has a value different from the minimum value MIN, the method comprises checking whether the pointer POINTER has a value equal to a steady-state value TARGET, e.g., by comparing the pointer value POINTER with the target value TARGET stored in the lookup table of possible observation window duration values, block 422: in case the value of the pointer POINTER is not equal to the minimum MIN nor to the target TARGET, the method comprises decrementing, e.g., by one unit, the value of the pointer POINTER, for reducing the duration of the time window as a result, while if the pointer POINTER is either equal to the minimum MIN or to the target TARGET, its value remains unchanged.

As exemplified in FIG. 4, if the block 404 detects that the current I lags by a delay δ with respect to the reference ZC event, this quickly triggers increase of the observation window size. This way, the next incoming ZC detection can be corrected, stabilizing the loop and performing a substantially exact ZC detection.

Inventors have observed that detecting polarity of the current signal I may improve accuracy in ZC sensing and control on current polarity with respect to actual ZC of the BEMF voltage signal $V_{BEMF}$.

For instance, the method comprises detecting polarity (that is, phase) of the current signal I at a time instant at half oscillation forward, plus a certain further shift value (such as twenty electrical degrees, or a custom positive value below a tenth of oscillation period such as thirty electrical degrees, for instance, or set by the user), with respect to the reference zero-crossing event used to detect the motor position.

In the exemplary case of a sinusoidal current signal I, checking polarity of the current signal I involves, for instance:

checking whether the phase of the signal is below or above a certain phase value (e.g., 180 electrical degrees or n radians), and in case the phase of the signal is below 180 electrical degrees, determining that the polarity of the current signal I is positive, or in case the phase of the signal is above 180 electrical degrees, determining that the polarity of the current signal I is negative.

As exemplified in FIG. 5, performing a current polarity check as in block 404 of FIG. 4 comprises:

block 50: verifying that a zero-crossing has been detected, e.g., by detecting a rising edge in the ZC sensing signal ZCS, block 52: waiting for the time instant shifted with respect to the time instant at which the zero-crossing is detected, the time instant being shifted by a certain phase shift in the current signal I (e.g., 20 electrical degrees and/or a custom delay interval), block 54: detecting a phase of the current signal I with respect to the BEMF voltage $V_{BEMF}$, as discussed in the following with reference to FIG. 5, block 56: performing a comparison of the phase of the current signal I with a threshold value, for instance checking that the polarity of the current signal is positive or negative via comparing the phase with a zero-threshold, and checking whether the detected phase of the current signal I is above or below the threshold value (e.g., checking whether the polarity of the current signal is negative or positive); for instance, when the threshold is zero, the comparison reaching the threshold value is indicative of a positive current polarity (e.g., when the phase is below n radians or 180 electrical degrees) while the comparison failing to reach the threshold value is indicative of a negative current polarity (e.g., when the phase is above n radians or 180 electrical degrees), and block 58: in case of the comparison yields a first result, e.g., negative polarity check of the current I, increasing the pointer value POINTER, e.g., by an integer scaling factor N higher than or equal to unity, increasing the window size, while in case the comparison yields a second result, e.g., positive polarity check of the current signal I, the system maintains the current window size unaltered.

Figure 6:
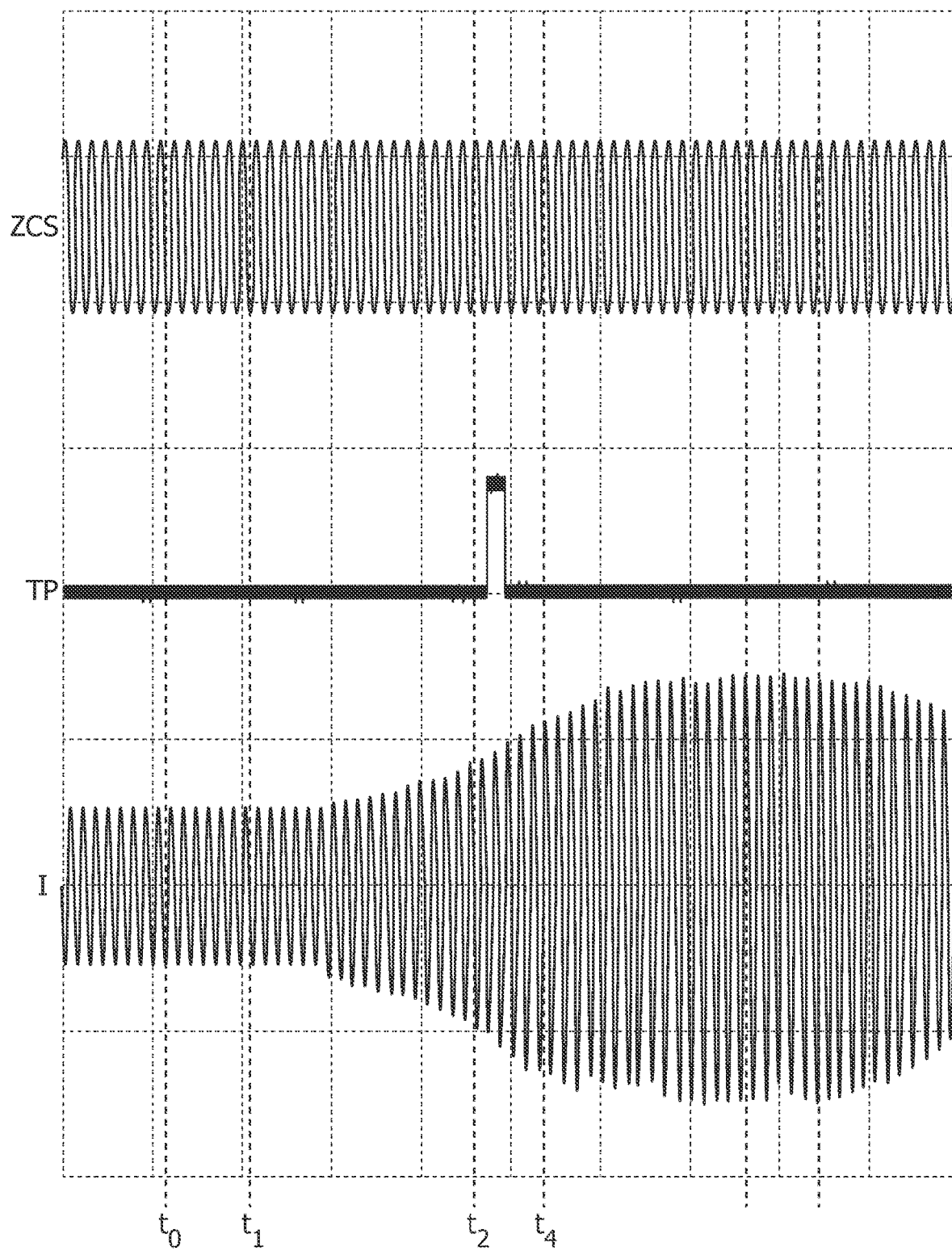
FIG. 6 comprises time diagrams of signals in one or more embodiments as per the present disclosure.

FIG. 6 shows possible time diagrams of signals produced in using the method exemplified in FIGS. 4 and 5.

As exemplified herein, the method comprises driving an electric motor having a set of motor windings in a pulse width modulation, PWM, mode, wherein the PWM mode comprises applying PWM signals to the motor windings in the set of motor windings of the electric motor. For instance, the method comprises:

setting 400 a finite time length value W0, W1 of a time window having a finite length in time, selecting a motor winding in the set of motor windings of the electric motor and driving the selected motor winding in the set of motor windings of the electric motor to be in a tri-state during a time interval having a time length equal to the set time length value $W_0$ of the time window, sensing 402, 406 a zero-crossing, ZC, of an oscillating back electromotive force $V_{BEMF}$ induced in the motor winding during the time window in which the motor winding is in the tri-state and producing a ZC sensing signal ZCS as a result, the ZC sensing signal having a first edge at a first time instant at the sensed ZC event and a second edge at a second time instant t* that is separated from the first time instant of half oscillation of the oscillating back electromotive force, detecting 50, 52, 54 a phase of a current I flowing in the selected motor winding at a time instant t*+G that is time shifted by a time shift G (e.g., in a range above zero and below a tenth of an oscillation period) with respect to the second time instant of the second edge of the ZC sensing signal, and adjusting 56, 58 the finite time length value of the time window based on the detected phase of the current I.

As exemplified herein, the method comprises performing a comparison 56 between a threshold value and the detected phase of the current I flowing in the selected motor winding at the time interval t*+G time shifted with respect to the second time instant t* of the second edge of the ZC sensing signal ZCS, and adjusting 56, 58 the finite time length value $W_0$, $W_1$ of the time window as a result of the detected phase of the current signal I reaching or failing to reach the threshold value.

As exemplified herein, adjusting 56, 58 the finite time length value $W_0$, $W_1$ of the time window as a result of the detected phase of the current I reaching or failing to reach the threshold value comprises increasing 58 the finite time length value $W_0$, $W_1$ of the time window in case the detected phase of the current I fails to reach the threshold, and maintaining the finite time length value $W_0$, $W_1$ of the time window in case the detected phase of the current I reaches or exceeds the threshold.

For instance, the method comprises checking whether the detected phase of the current I flowing in the selected motor winding has a positive polarity or a negative polarity at the time interval t*+G that is time shifted with respect to the second time instant t* of the second edge of the ZC sensing signal ZCS.

In a first exemplary case in which the detected phase of the current I has a negative polarity, the method comprises increasing 58 the finite time length value $W_0$, $W_1$ of the time window.

In this exemplary case, increasing 58 the finite time length value $W_0$, $W_1$ of the time window comprises scaling the finite time length value by an integer positive scaling factor, for instance.

In a further exemplary case in which the detected phase of the current I has a positive polarity 56, 58, the method comprises maintaining the finite time length value $W_0$, $W_1$ of the time window.

Figure 6A:
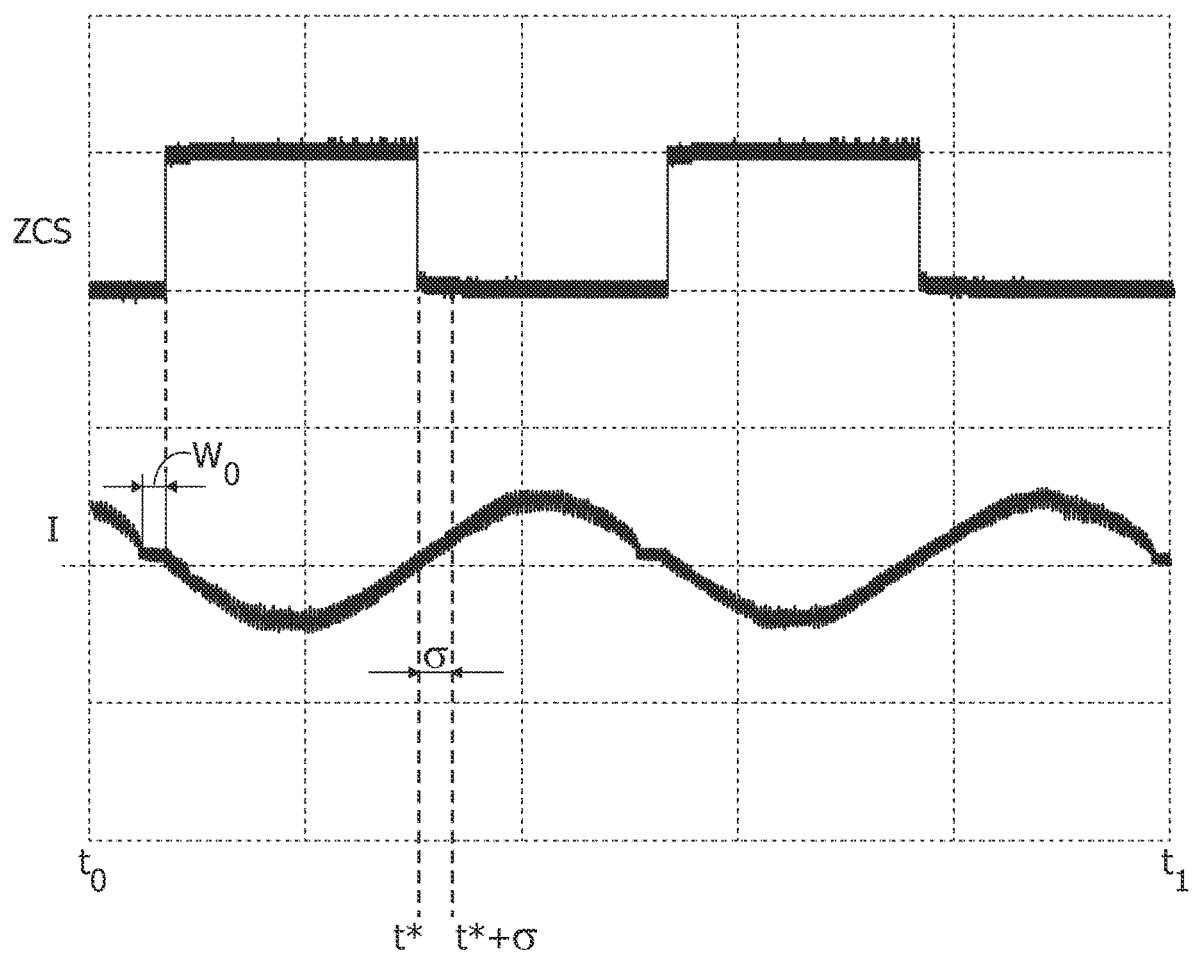

FIG. 6A is an enlarged view of a portion of time-diagrams of the current I and the ZC sensing signal ZCS during a steady-state time interval $t_0$-$t_1$ exemplified in FIG. 6.

As exemplified in FIG. 6A, applying the method in this exemplary scenario comprises:
   detecting an (e.g., falling) edge in the sensing signal ZCS, a potential zero-crossing event at t* is detected (as in block 50 of FIG. 5),
   waiting a time interval G, e.g., 6=20°, and detecting the phase of the current signal I at the shifted time instant t*+G (as in block 54 of FIG. 5) that is shifted by the time interval σ with respect to the time t* of ZC event detection,
   performing a comparison between the detected phase of the current signal I and the threshold value (e.g., the checking of current signal polarity with respect to a zero-threshold, as in block 56 of FIG. 5), which in the exemplary case considered is positive, and
   maintaining the pointer value POINTER, maintaining the observation initial time length value W0 of the observation window as a result.

As exemplified in FIG. 6A, in stable conditions at controlled speed, the ZC sensing method works at high efficiency with the current I at minimum amplitude I—and no phase delay with respect to the BEMF zero-crossing of the motor 10.

In these conditions, the window adjustment algorithm as per the present disclosure uses an observation window having a minimum size $W_0$. For instance, this is thanks to the current I being recirculated when the window $W_0$ is opened is minimal and the time required for the current $I_0$ to be discharged is almost negligible.

Figure 6B:
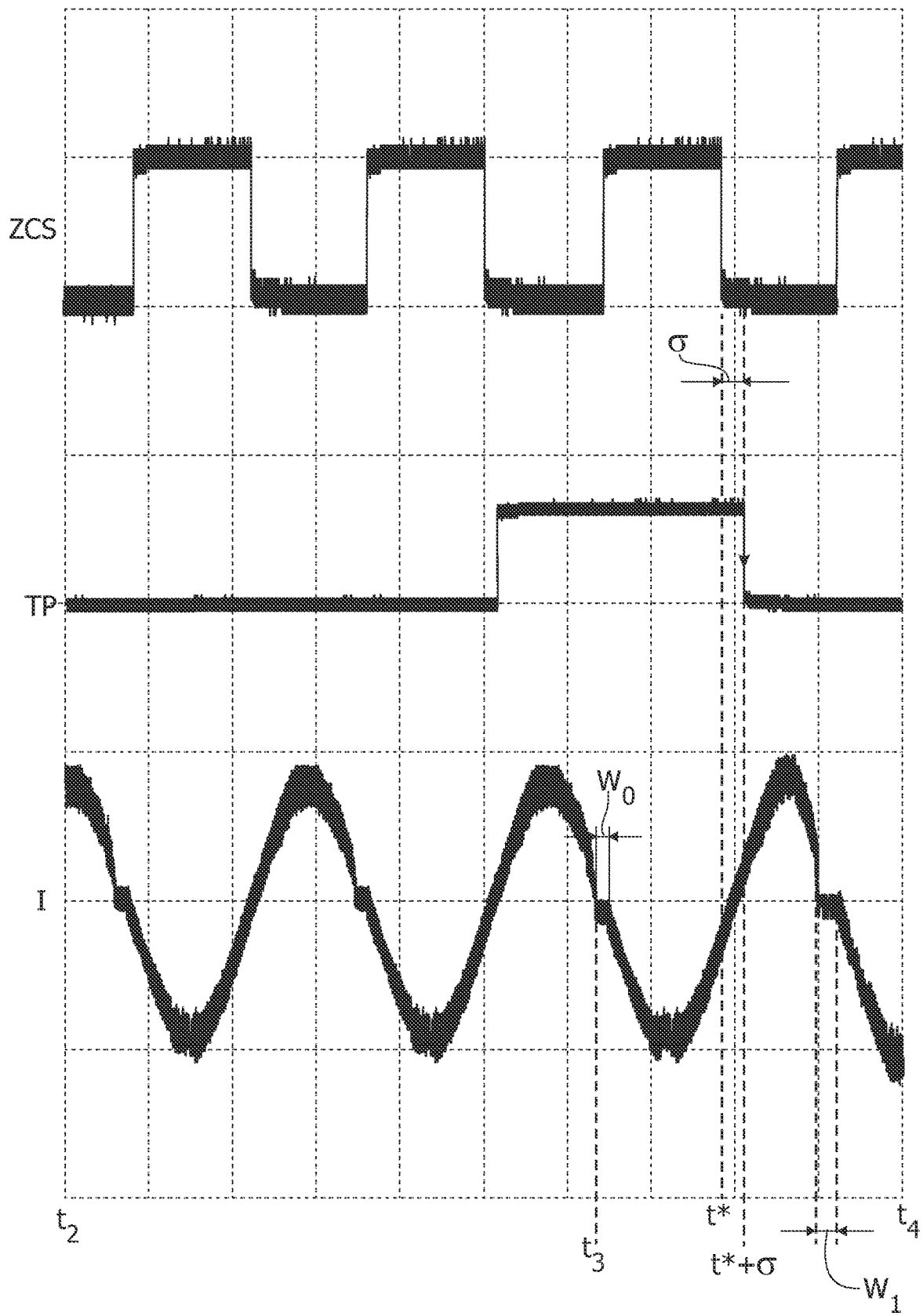

FIG. 6B is an enlarged view of a portion of time-diagrams of the current I and the zero-crossing detection signal ZC during a perturbed time interval $t_2$ to $t_4$ exemplified in FIG. 6.

For instance, during this perturbed time interval $t_2$ to $t_4$, the system varies the window size in order to correct errors in BEMF ZC sensing in response to a shock applied to the hard disk according to the method as per the present disclosure.

As exemplified in FIGS. 6 and 6B, applying the method in this exemplary scenario comprises:

detecting an (e.g., falling) edge in the sensing signal ZCS, so that a potential zero-crossing event (e.g., a second zero-crossing at t*) is detected (as in block 50 of FIG. 5),
waiting a time interval σ, e.g., σ=20°, and detecting the phase of the current signal I at the shifted time instant t*+σ (as in block 54 of FIG. 5) that is shifted by the time interval σ with respect to the time t* of (e.g., the second) ZC event detection,
performing a comparison between the detected phase of the current I and a threshold value, (e.g., verifying the polarity or "sign" of the current signal I by comparing the phase of the current signal I polarity with a threshold value equal to 180 electrical degrees, as in block 56 of FIG. 5), which in this exemplary case is verified to be negative, and
increasing the pointer value POINTER by an integer scaling factor N (as in block 58 of FIG. 5), e.g., from minimum value $W_0$ to a greater size $W_1$, varying the observation window size $W_0$ as a result.

Optionally, in order to underline principles regarding one or more embodiments, a "dummy" test point signal TP can be used to highlight the time instants at which the pointer value POINTER is checked and eventually varied. In such a notional scenario as exemplified in FIGS. 6 and 6B, the dummy test point signal TP is asserted:
   with a first value (e.g., "1" or "high") in response to detecting a positive polarity of the current signal I at a first falling edge of the ZC sensing signal ZCS, maintaining unaltered the size of the observation window as a result, and
   with a second value (e.g., "0" or "low") in response to detecting a negative polarity of the current signal I at a second falling edge of the ZC sensing signal ZCS, triggering correction (e.g., increase from the initial value $W_0$ to the increased value $W_1$) of the time length of the ZC observation window.

Figure 6C:
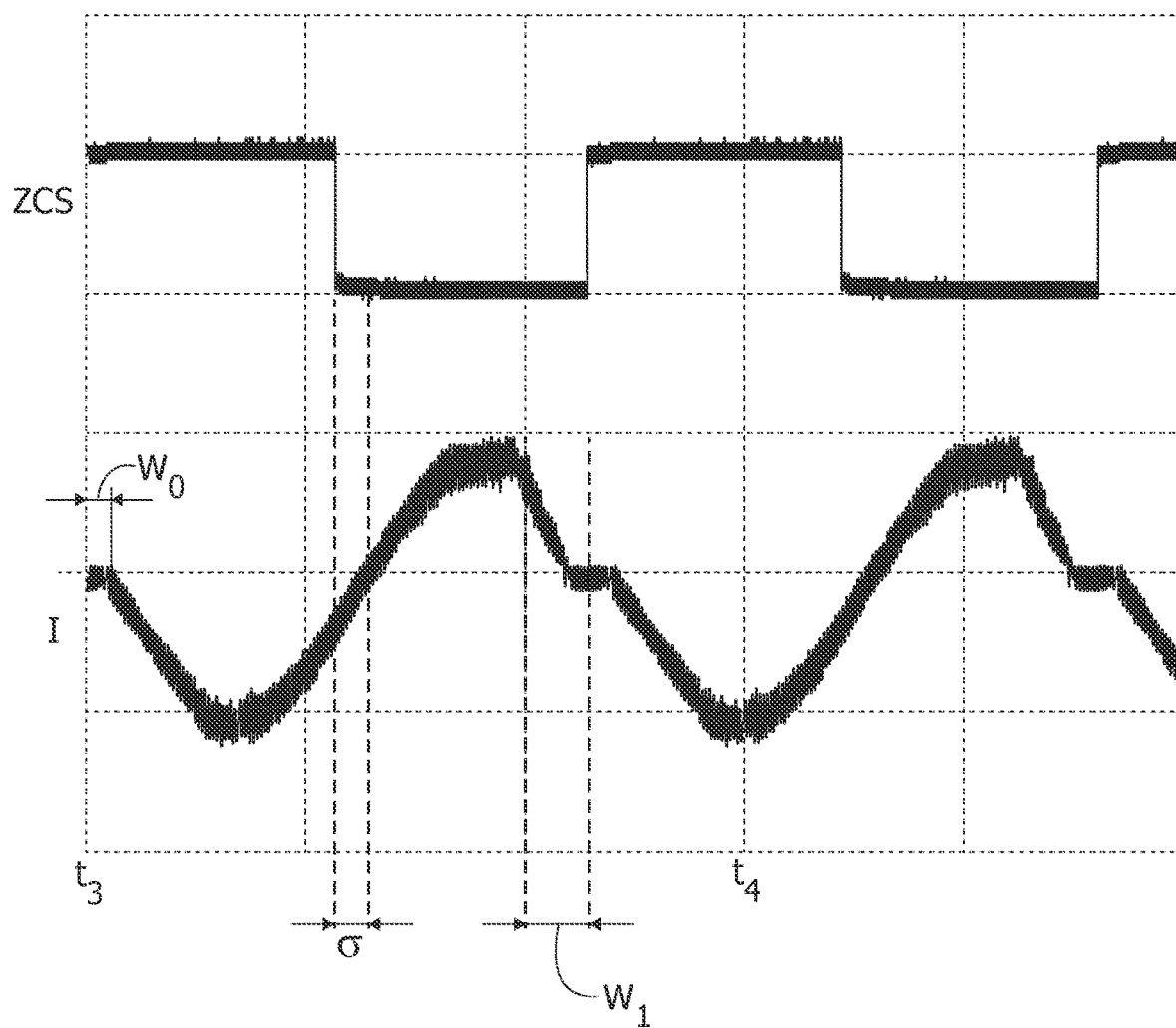
FIG. 6C comprises an enlarged view of a portion of time diagrams of signals in FIG. 6B.

FIG. 6C is a further enlarged view of the time diagrams of current signal I and ZC sensing signal ZCS during a subinterval $t_3$-$t_4$ in the perturbed time interval $t_2$-$t_4$.

In one or more embodiments, the method of adjusting the time length of the observation window is quick to detect whether the system is no longer in stable conditions by assessing current polarity, preventing an erroneous sensing of BEMF zero-crossing by adjusting the window size to account for the current amplitude increase IS and phase delay δ due to the perturbation.

As exemplified in FIG. 6C, after detecting (e.g., at shifted time instance t*-σ) that the polarity of the current signal I is negative, the method envisages to vary the length of the window from the initial value $W_0$ to an increased value $W_1$ (e.g., $W_1$=N*$W_0$) in order to be able to mask the (longer) time interval in which the motor current I is recirculated to zero.

As exemplified herein, a control system 70 comprises a controller configured to drive an electric motor having a set of motor windings in a pulse width modulation, PWM, mode, wherein the PWM mode comprises applying PWM signals to the motor windings in the set of motor windings of the electric motor. As exemplified herein, the controller is configured to drive the electric motor according to the method as per the present disclosure.

For instance, the control system may be coupled to the set of motor windings of the electric motor and configured to operate the electric motor in a PWM mode.

As exemplified herein, the electric motor is a brushless electric motor, for instance.

Figure 7:
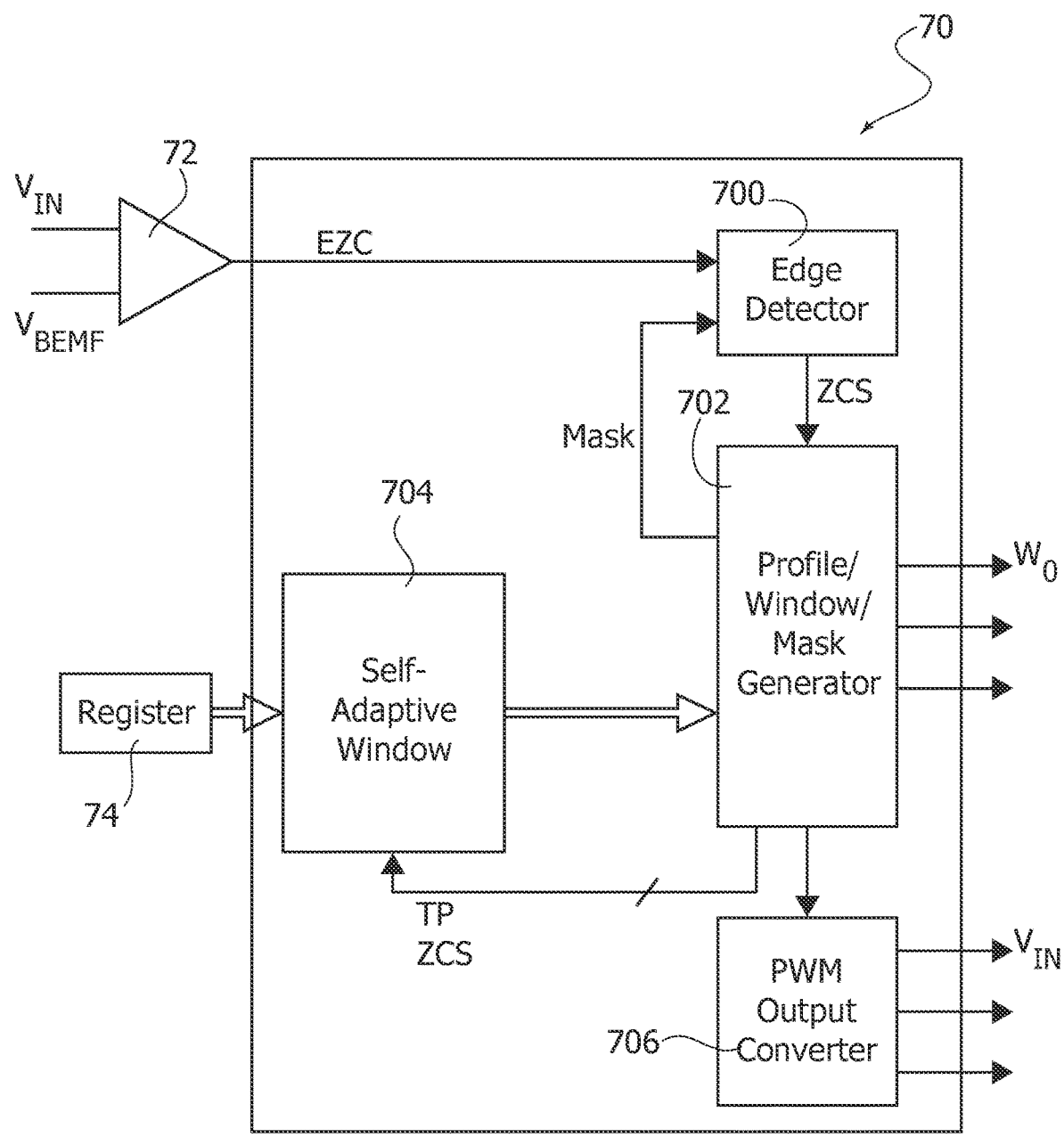
FIG. 7 is an exemplary diagram of a motor driver as per the present disclosure.

As exemplified in FIG. 7, a system 70 configured to control the electric motor 10, such as a spindle motor in an HDD application, for instance, comprises:

a comparator 72 coupled to a motor coil in high impedance, the comparator 72 configured to produce the flag EarlyZC (EZC), an edge detector 700 configured to receive the flag EZC as output by the comparator 42 and to produce a flag ZC to a driving profile, window and mask generator 402, and receives the masking signal therefrom, as will be explained below, a driving profile generator 702 configured to produce a set of tri-state signals, e.g., a first tri-state signal $V_{IN}$, to the analog drives and to generate a set of window size signals, e.g., a first window size $W_0$, and a corresponding mask for detecting the ZC signal, a self-adaptive window 704 coupled to the driving profile, window and mask generator 402 and configured to provide the contents of an external target window/mask register 74 thereto, as well as to receive flag signals HZC, the clock signal TP and EAZC therefrom, as discussed in the foregoing;

a PWM output converter 706 coupled to the profile, window and mask generator 702 and configured to output PWM signals to analog drivers.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A method, comprising:
    driving an electric motor having a set of motor windings in a pulse width modulation (PWM) mode comprising applying PWM signals to the motor windings in the set of motor windings of the electric motor;
    setting a finite time length value of a time window having a finite length in time,
    selecting a motor winding in the set of motor windings of the electric motor and driving the selected motor winding in the set of motor windings of the electric motor to be in a tri-state during a time interval having a time length equal to the set time length value of the time window;
    sensing a zero-crossing (ZC) of an oscillating back electromotive force induced in the motor winding during the time window in which the motor winding is in the tri-state and producing a ZC sensing signal as a result, the ZC sensing signal having a first edge at a first time instant at the sensed ZC and a second edge at a second time instant that is separated from the first time instant by a half oscillation of the oscillating back electromotive force;
    detecting a phase of a current flowing in the selected motor winding at a time instant that is time-shifted by a time shift with respect to the second time instant of the second edge of the ZC sensing signal; and
    adjusting the finite time length value of the time window based on the detected phase of the current.

2. The method of claim 1, wherein the time shift is equal to a user-settable adjustment value in a range from about zero electrical degrees to about thirty electrical degrees.

3. The method of claim 1, comprising:
    comparing a threshold value with the detected phase of the current flowing in the selected motor winding at the time interval time-shifted with respect to the second time instant of the second edge of the ZC sensing signal; and
    adjusting the finite time length value of the time window as a result of the detected phase of the current reaching or failing to reach the threshold value.

4. The method of claim 3, wherein adjusting the finite time length value of the time window as a result of the detected phase of the current reaching or failing to reach the threshold value comprises:
    increasing the finite time length value of the time window in case the detected phase of the current fails to reach the threshold value; or
    maintaining the finite time length value of the time window in case the detected phase of the current reaches or exceeds the threshold value.

5. The method of claim 4, wherein increasing the finite time length value of the time window comprises scaling the finite time length value by an integer positive scaling factor.

6. The method of claim 1, comprising:
    checking whether the detected phase of the current flowing in the selected motor winding has a positive polarity or a negative polarity at the time interval that is time-shifted with respect to the second time instant of the second edge of the ZC sensing signal; and
    in case the detected phase of the current has the negative polarity, increasing the finite time length value of the time window; or
    in case the detected phase of the current has the positive polarity, maintaining the finite time length value of the time window.

7. The method of claim 6, wherein increasing the finite time length value of the time window comprises scaling the finite time length value by an integer positive scaling factor.

8. A control system, comprising:
    a controller configured to:
        drive an electric motor having a set of motor windings in a pulse width modulation (PWM) mode, wherein the PWM mode comprises applying PWM signals to the motor windings in the set of motor windings of the electric motor;
        set a finite time length value of a time window having a finite length in time;
        select a motor winding in the set of motor windings of the electric motor and drive the selected motor winding in the set of motor windings of the electric motor to be in a tri-state during a time interval having a time length equal to the set time length value of the time window;
        sense a zero-crossing (ZC) of an oscillating back electromotive force induced in the motor winding during the time window in which it is in the tri-state, producing a ZC sensing signal as a result, the ZC sensing signal having a first edge at a first time instant at the sensed a ZC and a second edge at a second time instant that is separated from the first time instant by a half oscillation of the oscillating back electromotive force;
        detect a phase of a current flowing in the selected motor winding at a time instant that is time-shifted by a time shift with respect to the second time instant of the second edge of the ZC sensing signal; and adjust the finite time length value of the time window based on the detected phase of the current.

9. The control system of claim 8, wherein the time shift is equal to a user-settable adjustment value in a range from about zero electrical degrees to about thirty electrical degrees.

10. The control system of claim 8, wherein the control system is further configured to:

compare a threshold value with the detected phase of the current flowing in the selected motor winding at the time interval time-shifted with respect to the second time instant of the second edge of the ZC sensing signal; and adjust the finite time length value of the time window as a result of the detected phase of the current reaching or failing to reach the threshold value.

11. The control system of claim 10, wherein the control system is further configured to:

increase the finite time length value of the time window in case the detected phase of the current fails to reach the threshold value; and maintain the set finite time length value of the time window in case the detected phase of the current reaches or exceeds the threshold value.

12. The control system of claim 10, wherein the control system is further configured to:

check whether the detected phase of the current flowing in the selected motor winding at the time interval time-shifted with respect to the second time instant of the second edge of the ZC sensing signal has a positive polarity or a negative polarity;

in case the detected phase of the current has the negative polarity, increasing the finite time length value of the time window; and in case the detected phase of the current has the positive polarity, maintaining the finite time length value of the time window.

13. The control system of claim 12, wherein the control system is further configured to:

increase the finite time length value of the time window in case the detected phase of the current fails to reach the threshold value; and maintain the set finite time length value of the time window in case the detected phase of the current reaches or exceeds the threshold value.

14. The control system of claim 12, wherein the control system is configured to increase the finite time length value of the time window via scaling the set finite time length value by an integer positive scaling factor.

15. An electric motor comprising:

a set of motor windings; and a control system coupled to the set of motor windings and configured to:

operate the electric motor in a pulse width modulation (PWM) mode, wherein the PWM mode comprises applying PWM signals to the motor windings in the set of motor windings of the electric motor;

set a finite time length value of a time window having a finite length in time;

select a motor winding in the set of motor windings of the electric motor and drive the selected motor winding in the set of motor windings of the electric motor to be in a tri-state during a time interval having a time length equal to the set time length value of the time window;

sense a zero-crossing (ZC) of an oscillating back electromotive force induced in the motor winding during the time window in which it is in the tri-state, producing a ZC sensing signal as a result, the ZC sensing signal having a first edge at a first time instant at the sensed a ZC and a second edge at a second time instant that is separated from the first time instant by a half oscillation of the oscillating back electromotive force;

detect a phase of a current flowing in the selected motor winding at a time instant that is time-shifted by a time shift with respect to the second time instant of the second edge of the ZC sensing signal; and adjust the finite time length value of the time window based on the detected phase of the current.

16. The electric motor of claim 15, wherein the electric motor is a brushless electric motor.

17. The electric motor of claim 15, wherein the time shift is equal to a user-settable adjustment value in a range from about zero electrical degrees to about thirty electrical degrees.

18. The electric motor of claim 15, wherein the control system is further configured to:

compare a threshold value with the detected phase of the current flowing in the selected motor winding at the time interval time-shifted with respect to the second time instant of the second edge of the ZC sensing signal; and adjust the finite time length value of the time window as a result of the detected phase of the current reaching or failing to reach the threshold value.

19. The electric motor of claim 18, wherein the control system is further configured to:

increase the finite time length value of the time window in case the detected phase of the current fails to reach the threshold value; and maintain the set finite time length value of the time window in case the detected phase of the current reaches or exceeds the threshold value.

20. The electric motor of claim 18, wherein the control system is further configured to:

check whether the detected phase of the current flowing in the selected motor winding at the time interval time-shifted with respect to the second time instant of the second edge of the ZC sensing signal has a positive polarity or a negative polarity;

in case the detected phase of the current has the negative polarity, increasing the finite time length value of the time window; and in case the detected phase of the current has the positive polarity, maintaining the finite time length value of the time window.

* * * * *